(12) United States Patent  (10) Patent No.: US 9,234,139 B2
Bauman et al.  (45) Date of Patent: Jan. 12, 2016

(54) DIESEL FUEL PRODUCTION PROCESS EMPLOYING DIRECT AND INDIRECT COAL LIQUEFACTION

(71) Applicant: Accelergy Corporation, Houston, TX (US)

(72) Inventors: Richard F. Bauman, Billingham, WA (US); Gerald A. Melin, Williamsburg, VA (US); Kenneth L. Trachte, Rancho Viejo, TX (US)

(73) Assignee: ACCELERGY CORPORATION, Houston, TX (US)

( * ) Notice: Subject to any disclaimer, the term of this patent is extended or adjusted under 35 U.S.C. 154(b) by 546 days.

(21) Appl. No.: 13/657,087

(22) Filed: Oct. 22, 2012

(65) Prior Publication Data

US 2013/0104611 A1 May 2, 2013

Related U.S. Application Data

(66) Substitute for application No. 61/553,981, filed on Nov. 1, 2011.

(51) Int. Cl.
| | |
|---|---|
| *C10G 1/06* | (2006.01) |
| *C10G 2/00* | (2006.01) |
| *C05F 5/00* | (2006.01) |
| *C05F 11/00* | (2006.01) |
| *C10G 45/58* | (2006.01) |
| *C10G 1/04* | (2006.01) |

(52) U.S. Cl.
CPC ... *C10G 2/32* (2013.01); *C05F 5/00* (2013.01); *C05F 11/00* (2013.01); *C10G 1/042* (2013.01); *C10G 45/58* (2013.01); *C10G 2300/1022* (2013.01); *C10G 2400/04* (2013.01)

(58) Field of Classification Search
CPC ............ C10G 2/32; C10G 45/58; C10G 1/42; C10G 2400/04; C10G 2300/1022; C05F 11/00; C05F 5/00
USPC .................................. 208/412, 416, 419, 427
See application file for complete search history.

(56) References Cited

U.S. PATENT DOCUMENTS

| | | | |
|---|---|---|---|
| 4,226,742 A | 10/1980 | Bearden et al. | |
| 5,256,278 A * | 10/1993 | Rindt et al. .................... | 208/400 |
| 2009/0227003 A1* | 9/2009 | Blotsky et al. .............. | 435/257.1 |
| 2009/0286889 A1* | 11/2009 | Fiato ............................... | 518/700 |
| 2011/0174683 A1* | 7/2011 | Cui et al. ......................... | 208/89 |
| 2012/0144887 A1 | 6/2012 | Fiato et al. | |
| 2013/0149767 A1* | 6/2013 | Marion .................. | C10G 1/002 435/168 |

OTHER PUBLICATIONS

Choudry et al, Influence of rank and macerals on the burnout behaviour of pulverized Indian coal, 2008, 145-153.*

(Continued)

*Primary Examiner* — Randy Boyer
*Assistant Examiner* — Juan Valencia

(57) ABSTRACT

A combined Direct Coal Liquefaction (DCL)/Fischer Tropsch (F-T) process and system for producing high Cetane diesel fuel by converting at least 70% of the feed coal by DCL operating at 50 to 70% conversion and gasifying the bottoms and between 0 and 30% of the feed coal to produce H2 for supply to the DCL and to upgrading and syngas for being converted to diesel by F-T. Diesel blendstocks produced by the DCL and the F-T in a ratio of 3 to 1 to 14 to 1 are blended to produce diesel fuel having a Cetane Number of at least 51 and a specific gravity of 0.845 or less.

20 Claims, 2 Drawing Sheets

(56) References Cited

OTHER PUBLICATIONS

Clean Coal Technology: Direct and Indirect Coal-to-Liquid Technologies, Liu, 2005.

Direct Coal Liquefaction Overview Presented to NETL, Winslow, et al, National Energy Technology Laboratory, U.S. Department of Energy, 2009.

The Hybrid Plant Concept: Combining Direct and Indirect Coal Liquefaction Processes, Gray, et al.

Overview of Coal Liquefaction, Lepinski, et al, U.S. India Coal Working Group Meeting Nov. 18, 2005.

Yong-Wang, Li, "Indirect Coal Liquefaction—Better Solution to Clean Energy System", Synfuels China, State Key Laboratory of Coal Conversion, Institute of Coal Chemistry, Chinese Academy of Sciences, 2005.

Direct Coal Liquefaction Process & Its Hybrid Systems, Tam, et al, World CTL 2009.

Headwaters, Headwaters DCL Technology—Conversion of Coal into Clean Transportation Fuels.

Rentech, Inc., The Economic Viability of an FT Facility Using PRB Coals, 2005.

NETL, Affordable, Low-Carbon Diesel Fuel from Domestic Coal and Biomass, 2009.

Zhang, Yuzho, Shenhua Coal Conversion Technology and Industry Development.

Jay A. Ratafia-Brown, et al, An Environmental Assessment of IGCC Power Systems, Nineteenth Annual Pittsburgh Coal Conference, Sep. 23-27, 2002.

* cited by examiner

DIESEL FUEL PRODUCTION PROCESS EMPLOYING DIRECT AND INDIRECT COAL LIQUEFACTION

FIELD OF THE INVENTION

The present invention relates to a combination of direct and indirect coal liquefaction processes and apparatus.

BACKGROUND

European specifications for diesel fuel (Euro 4) require a high Cetane number (CN) (minimum 51) with a low specific gravity (0.845 maximum). This fuel can be readily produced from biomass, natural gas or coal via Fischer-Tropsch (F-T) synthesis. These approaches produce a diesel fuel that is very paraffinic with high CN and low specific gravity. Such diesel fuels, however, have relatively low energy content per gallon, and thus provide lower mileage per gallon when used as a transportation fuel. Additionally, in order to produce a diesel fuel having acceptable cold flow properties for use in many parts of the world, the F-T product needs to be a hydroisomerized. Other important disadvantages of F-T processes for producing diesel fuel from coal are that they have low thermal efficiency and relatively high CO2 emissions.

The overall thermal efficiency (HHV), for a balanced F-T plant with zero imported or exported power, is typically 41 to 48% depending upon the coal and gasification process utilized. The Chinese coal company Shenhua, which has built both commercial F-T and DCL plants, reported a thermal efficiency of 41.26% (1) for a Chinese coal using low temperature F-T in a recent publication. Synfuels China (1) reported a thermal efficiency from coal of 43%. In a presentation to NETL, Schmetz (7) reported (source: the National Coal Council) the thermal efficiency for an F-T plant with gas recycle to be 47.4%.

Some U.S. studies have calculated somewhat higher thermal efficiencies for F-T plants that utilize entrained gasifiers such as Shell and coproduce power (Polygen). Headwaters (2) reported a thermal efficiency of 48.4% for a recycle F-T plant design producing 399 MW of export power and 70 KB/D of naphtha and diesel and 47.4% for a Once Through (OT) F-T plant producing 1,139 MW of power and 70 KB/D of gasoline and diesel.

Direct Coal Liquefaction (DCL) has also been proposed as a route to produce diesel fuel. Diesel from DCL has excellent cold flow properties but specific gravity (0.86 to 0.90) is significantly above the Euro 4 specification and CN is lower than the Euro 4 specification, even after severe hydrotreating to remove heteroatoms and hydrogenate aromatics to naphthenes. Chevron (10) reported studies on diesel fuel production from direct coal liquefaction products. The CN of the diesel fuels produced ranged from 32.7 to 48.7.

Selectivity to diesel has been also generally lower for DCL than for Fischer-Tropsch plants. In the Headwaters balanced plant cases, selectivity to diesel on a C5+ LV % basis is 71%; whereas, Synfuels China reported an 80% selectivity to diesel on a C5+ basis from their F-T Demo Plant.

Based on back-to-back comparisons of F-T and DCL, DCL has a significantly higher thermal efficiency than F-T. In 2008, Headwaters (2) reported thermal efficiency of 60.1% for DCL versus the previously reported 47.4% and 48.4% for OT and Recycle F-T with power export, a 24 to 27% advantage for DCL versus F-T. In 2005, Lepinski (3) presented a comparison of DCL and F-T for a sub-bituminous coal. For a 50 KB/D plant, 32 KST/D of as received coal was required for the F-T plant and 23 KST/SD for the DCL plant; an increase of 39%. Shenhua (6) reported the thermal efficiency of DCL at 59.75% versus 41.56% for High Temperature F-T and 41.26% for Low Temperature F-T, an increase of 44%.

Companies active in the field have generally sought to increase coal conversion in DCL (7) on a once through basis in order to decrease capital cost. Typical reported DCL coal conversion, on a moisture and ash free (MAF) basis, has increased from about 70% in 1980 to over 90% by 1994. This trend has decreased capital cost but has required the use of more expensive low ash and high reactivity (2) coals in order to avoid higher levels of ash in liquefaction, fractionation, and PDX that would interfere with the DCL process. For example, currently available PDX units are unable to process bottoms having an ash higher than about 30%. Higher reactivity coals are generally high in vitrinite and low in inertinite.

The reported DCL coal conversion units require the use of a hydrotreator for preparing a donor solvent that is fed back to the input of the DCL unit to act as a solvent for the coal being converted and to provide additional hydrogen to the liquefaction process. The hydrotreating makes solvent less aromatic, which reduces its compatibility with coal. Additionally, the specific gravity of such donor solvents is low which makes it more difficult to prepare a stable slurry, and results in settling of ash and separation of a separate phase that can result in equipment deposits and plugging. The temperature of the prepared coal slurry is typically about 100° F.

Others have proposed combining Fischer Tropsch and Direct Coal Liquefaction units in a single plant to produce a blended product. In both the Gray (11) and Headwaters studies (2), the DCL and F-T processes were described as being operated in parallel, each receiving a coal feed, and the DCL and F-T products were blended on a 50:50 basis. Because of the lower thermal efficiency of F-T versus DCL, this requires that greater than 50% of the coal be processed by the lower thermal efficiency F-T. For Headwaters, (2) this was calculated to result in a Hybrid DCL/ICL plant that has a C3+ selectivity of 67% and a thermal efficiency of 58.7%. Neither the Gray nor the Headwaters combined FT and DCL plant has actually been constructed, and the descriptions say nothing about the CN of any diesel fuel that might be produced.

Currently, Carbon Capture and Sequestration (CCS) is the leading option for managing CO2 emissions. CO2 which is captured in the plant is compressed to approximately 2,400 psi and injected into underground formations. Because a significant portion of the CO2 produced by the plant, e.g., that emitted from furnaces, cannot be readily captured, as a practical matter the CO2 sequestered is limited to at most approximately 90%, and typically substantially less. In addition, depending on the environmental and geological conditions in the vicinity of the plant, the compressed CO2 may have to be transported substantial distances to the injection site, and the compression of the CO2 consumes energy, both of which lower the overall efficiency of the plant. Moreover, there is a continuing concern that the sequestered CO2 may escape into the atmosphere over time, thereby obviating at least part of the benefit of injecting the CO2. No provision for reducing CO2 emissions was made in any of the plants discussed above. Doing so would further reduce the thermal efficiency of the plants.

SUMMARY OF THE INVENTION

In accordance with the present invention, there has been provided a combined DCL and F-T coal conversion process and system having a high thermal efficiency and high conversion that produces diesel fuel having a CN of greater than 47, that is capable of producing diesel fuel meeting the Euro 4 CN and specific gravity specifications and that is capable of accepting less expensive high ash (from 6 to 30% on a moisture free basis) and high inertinite content (greater than 10% on a moisture free basis) coals. Surprisingly, it has been found that, for a combined DCL/F-T plant having a ratio of DCL produced diesel blend stock production to F-T diesel blend stock production in kilo barrels per day (KB/D) of 3 to 14, in which at least 70% of the feed coal is supplied to DCL and in which the DCL is operated at a conversion of between 50% and 70% on an MAF basis, and the unconverted coal liquefaction bottoms, and optionally up to 30% of the feed coal, are gasified to provide both hydrogen for liquefaction and syngas for F-T, it is possible to produce high MPG, ultra low sulfur diesel fuel having a CN of 50 or more, and, if desired, a Specific Gravity of 0.845 or less, to meet the Euro 4 diesel. Preferably, to increase thermal efficiency, the DCL process operates without a solvent hydrotreater, in substantially plug flow mode liquefaction reactors, utilizes a molybdenum-based microcatalyst, and recycles bottoms and solvent for slurrying the feed coal.

DETAILED DESCRIPTION OF PREFERRED EMBODIMENT

Figure 1:
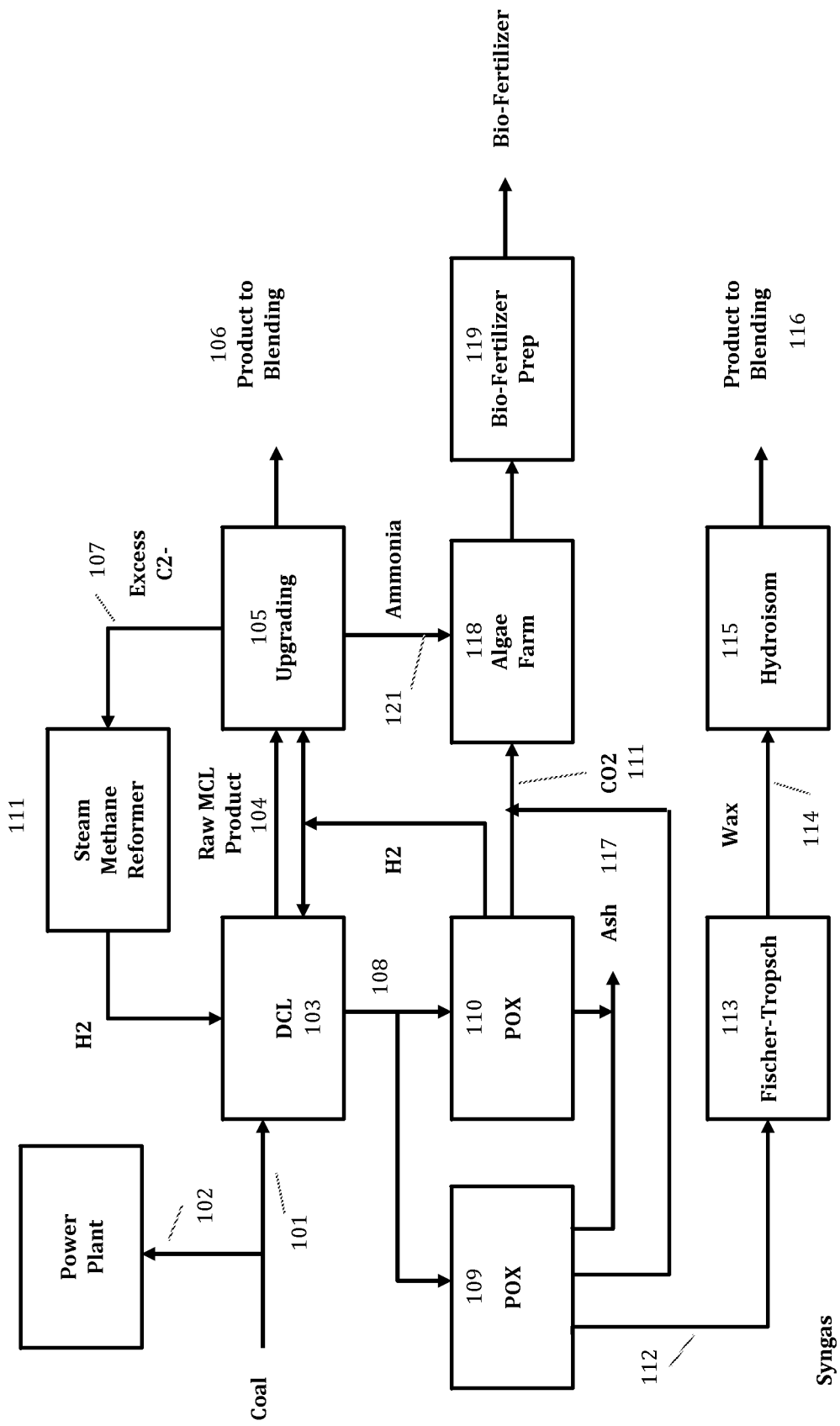
FIG. 1 is a schematic of the overall flow scheme of the illustrated embodiment of the invention.

FIG. 1 of the drawings, is a schematic of the overall flow scheme of the illustrated embodiment of the invention. In the embodiment of FIG. 1, at least 70% of the coal feed 101 is supplied to the DCL unit 103 which is operated at a conversion of between 50 and 70% on MAF basis, and preferably between 54 and 60%. Optionally, additional coal can be supplied to a power plant 102 for producing incremental power, if required, for the complex. In the DCL unit 103, coal is hydrogenated to produce raw liquid products and an effluent stream 108 that consists of ash, unconverted coal, and liquids boiling above 1000° F. The raw liquid products 104 then flow to the upgrader 105. In upgrading, heteroatoms are removed and a major portion of the aromatics present in the raw liquids are converted into naphthenes. Products from the upgrader include LPG, a high octane gasoline blend stock, and a high specific gravity diesel blend stock having a CN of 42 to 47. Light gases produced in DCL and upgrading are used to supply a portion of the fuel for the complex. Excess light gases (C2–) 107 are sent to a steam methane reformer to supply a portion of the hydrogen required by the DCL plant.

The bottoms stream 108 from the DCL unit 103 is sent to the gasifiers 109 and 110 where the stream is Partially Oxidized (PDX) to produce a product containing hydrogen, carbon monoxide, carbon dioxide, methane, nitrogen, hydrogen sulfide, and HCN. The feed to the gasifiers 109 and 110 can be either a molten liquid or the bottoms stream can be solidified and sent to the PDX units as a water slurry. Up to 30%, and preferably between 0 and 15%, of the feed coal can also be sent to be gasified in the PDX units 109 and/or 110. The PDX units serve two purposes: (1) production of hydrogen for the DCL 103, the upgrader 105, and the Hydroisomerization unit 115; and (2) to provide syngas for conversion to Fischer-Tropsch products. The gasifiers are illustrated as two separate PDX units 109 and 110 in which PDX unit 109 is used to supply syngas 112 to the F-T unit 113 and PDX unit 110 supplies hydrogen to the DCL unit 103 and the upgrader 105. If desired, however, the gasification can be implemented using a single PDX unit. The Fischer-Tropsch Synthesis Unit 113 converts the synthesis gas 112 into primarily waxy, normal paraffins 114. This material is then hydroisomerized in unit 115 to produce a high CN, low specific gravity diesel blend stock and a low octane gasoline blend stock.

Because of the relatively low conversion of coal in the DCL unit 103, the bottoms sent to the PDX units 109 and 110 contains a greater portion of unconverted coal, and therefore, for a given coal, contains a lower concentration of ash than would be present at high conversion such as taught in the prior art. This permits the use, in the illustrated embodiment of the present invention, of coals having substantially higher ash and/or higher inertinite contents than would be permitted in a high conversion system.

The blend stocks from DCL and F-T are then blended in a ratio of between 3 to 1 and 14 to 1 to produce a high CN diesel fuel. The higher the ratio of DCL to F-T, the higher the thermal efficiency of the combined process and the energy content and specific gravity of the diesel fuel produced. If it is desired to produce a diesel fuel meeting the Euro 4 CN and specific gravity specifications, the ratio of DCL to F-T blend stocks needs to be in the range of about 5 to 1 to 7 to 1. If it is not necessary to meet the Euro 4 specific gravity specification for a particular application, a higher CN can be achieved by adding a conventional Cetane improver, such as the Lubrizol 8090 Cetane Improver, to the blended DCL/F-T diesel fuel.

Preferably, $CO_2$ 111 from PDX, particularly the higher pressure portion produced from Selexol (See below), and ammonia 121 produced during coal liquefaction and upgrading is sent to the algae farm 118 where it is converted into cyanobacteria or algae which can be subsequently made into bio-fertilizer or a soil amendment agent. The algae farm 118 is normally implemented as a closed or open pond photobioreactor system (PBR), several of which are available. Alternatively, some or all of the cyanobacteria or algae can be used as a feedstock to produce fuels or other products, if desired. Ash from the PDX units (117) is a glassy solid that is non-leachable.

DCL Unit

Figure 2:
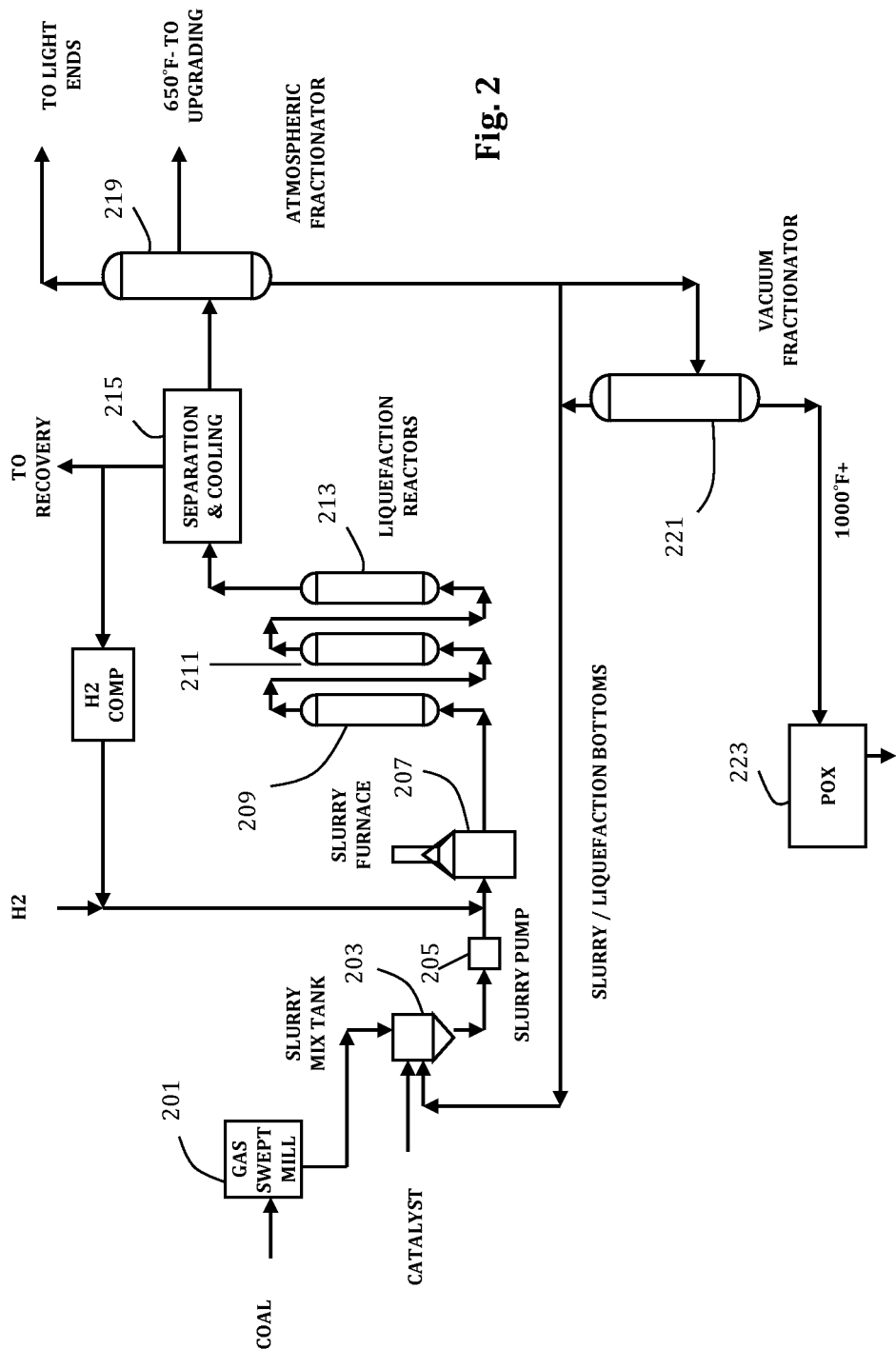
FIG. 2 is a schematic diagram of the flow scheme for the direct coal liquefaction portion of the illustrated embodiment of the invention.

Referring now to FIG. 2 of the drawings, the coal feed is dried and crushed in a conventional gas swept roller mill 201 to a moisture content of 1 to 4%. The crushed and dried coal is sent to a mixing tank 203 where it is mixed with recycle solvent, recycled bottoms, and a catalyst precursor to form a slurry stream. The catalyst precursor in the illustrated embodiment preferably is in the form of a 2-10% aqueous water solution of phosphomolybdic acid (PMA) in an amount that is equivalent to adding between 50 wppm and 2% molybdenum relative to the dry coal feed. In the slurry mix tank 203, the contents are agitated for about 10 to 100 minutes and preferably for 20 to 60 minutes at agitator speed defined a priori as a function of the slurry rheology. Similarly, the operating temperature is set to reflect the same rheological considerations. Typical operating temperature ranges from 250 to 600° F. and more preferably between 300 and 500° F. From the slurry mix tank the catalyst containing slurry is delivered to the slurry pump 205. The selection of the appropriate mixing conditions is based on experimental work quantifying the rheological properties of the specific slurry blend being processed.

The slurry leaves the mixing tank 203 at about 300 to 500° F. (139 to 260° C.). Most of the moisture in the coal is driven off in the mixing tank due to the hot recycle solvent (650/1000° F. or 353/538° C.) and bottom feeding to the mixing tanks. Residual moisture and any entrained volatiles are condensed out as sour water (not shown in FIG. 2). The coal in the slurry leaving the mixing tank 203 has about 0.1 to 1.0% moisture. The slurry formed by the coal and recycled bottoms fraction from the fractionators 219 and 221 is pumped from the mixing tank 203 and the pressure is raised to about 2,000 to 3,000 psig (138 to 206 kg/cm² g) by the slurry pumping system 205. The resulting high pressure slurry is preheated in a heat exchanger (not shown), mixed with hydrogen, and then further heated in furnace 207.

The coal slurry and hydrogen mixture is fed to the input of the first stage of the series-connected liquefaction reactors 209, 211 and 213 at about 600 to 700° F. (343° C.) and 2,000 to 3,000 psig (138 to 206 kg/cm² g). The reactors 209, 211 and 213 are up-flow tubular vessels, the total length of the reactors being 50 to 200 feet, and, together, operate in a substantially plug flow mode. Additional series-connected reactors can be provided if desired for a particular application. The temperature rises from one reactor stage to the next as a result of the highly exothermic coal liquefaction reactions. In order to maintain the maximum temperature in each stage below about 850 to 900° F. (454 to 482° C.), additional hydrogen is preferably injected between reactor stages. The hydrogen partial pressure in each stage is preferably maintained at a minimum of about 1,000 to 2,000 psig (69 to 138 kg/cm² g).

The effluent from the last stage, liquefaction reactor is separated into a gas stream and a liquid/solid stream, and the liquid/solid stream let down in pressure, in the separation and cooling system 215. The gas stream is cooled to condense out the liquid vapors of naphtha, distillate, and solvent. The remaining gas is then processed to remove $H_2S$ and $CO_2$. Most of the processed gas is then sent to the hydrogen recovery system, not shown, for further processing by conventional means to recover the hydrogen contained therein, which is then recycled to be mixed with the coal slurry. The remaining portion of the processed gas is purged to prevent buildup of light ends in the recycle loop. Hydrogen recovered therefrom is used in the downstream hydro-processing upgrading system.

The depressurized liquid/solid stream and the hydrocarbons condensed during the gas cooling are sent to the atmospheric fractionator 219 where they are separated into light ends, naphtha, distillate, and bottoms fractions. The light ends are processed to recover hydrogen and $C_1$-$C_4$ hydrocarbons that can be used for fuel gas and other purposes. The naphtha is hydrotreated to remove sulfur, nitrogen, oxygen, saturate diolefins, and remove other reactive hydrocarbon compounds. The 160° F.+ fraction of the naphtha is hydrotreated and catalytically reformed to produce gasoline. The distillate fraction is hydrotreated to produce products including diesel and/or jet fuel.

The atmospheric fractionator 219 is preferably operated at a high enough pressure so that a portion of the 600 to 700° F.+ (315 to 371° C.+) bottoms fraction can be recycled to the slurry mixing tank 203 without pumping for use as the solvent. Pumping of this stream may be difficult because of its high viscosity and high solids content. The remaining bottoms produced from the atmospheric fractionator 219 are fed to the vacuum fractionator 221 wherein it is separated into of 1000° F.− fraction and a 1000° F.+ fraction. The 1000° F.− fraction is added to the solvent stream being recycled to the slurry mix tank 203. At least a portion of the 1000° F.+ fraction is fed to the bottoms gasifier (PDX) 223 where it is reacted with oxygen to produce hydrogen, syngas and $CO_2$ by means of partial oxidation and water-gas shift reactions. A portion of the 1000° F.+ fraction may also be added to the solvent stream being recycled to the slurry mix tank 203. The ash resulting from the partial oxidation of the 1000° F.+ fraction and of the coal in the gasifier 223 can be sent to landfill or can be used to produce construction materials such as cement bricks, road surface paving material and other construction applications. The syngas is used as an input to the FT synthesis and the hydrogen is supplied for the DCL and product upgrading processes.

If the coal being converted by DCL is lignite, which has a higher $H_2O$ and $O_2$ content than bituminous or sub-bituminous coal, it is preferred to pre-treat the coal in an aqueous carbon monoxide-containing environment, as described in U.S. Pat. No. 5,026,475, the disclosure of which is hereby incorporated by reference in its entirety.

At the beginning of a run, typically an amount of PMA equivalent to adding about 1000 wppm of molybdenum microcatalyst, relative to the coal feed on MAF basis, to the mixing tank 203. As a level of microcatalyst increases in the slurry stream due to the recycle of microcatalyst entrained in the recycle solvent, the amount of PMA added to the mixing tank is gradually reduced until, in the steady-state, makeup microcatalyst is added at 100 to 500 wppm, and more preferably 100 to 300 wppm relative to the coal feed on MAF basis. Because of the amount of microcatalyst entrained in the recycle solvent, the actual amount of microcatalyst in the liquefaction reactors 209-213 is typically about 2 to 3 times higher than the makeup microcatalyst being added to the mixing tank in steady-state operation. If the DCL process is being operated with relatively low catalyst concentrations of about 50 wppm to 500 wppm, in which about 50 to 75% of the input coal is converted to products, it is economically attractive to recycle the portions of the catalyst that are entrained in the solvent and bottoms stream fed back to the slurry mix tank 203. Catalysts useful in DCL processes also include those disclosed in U.S. Pat. Nos. 4,077,867, 4,196,072 and 4,561,964, the disclosures of which are hereby incorporated by reference in their entirety.

Other DCL processes and reactor systems suitable for use in the ICBTL system of the invention are disclosed in U.S. Pat. Nos. 4,485,008, 4,637,870, 5,200,063, 5,338,441, and 5,389,230, the disclosures of which are hereby incorporated by reference in their entirety.

The preferred DCL Process combines several elements that contribute to maximizing diesel production and thermal efficiency. These include the use of a microcatalyst in the form of finely divided molybdenum, use of bottoms recycle, recycle of a non-donor, aromatic solvent, and the use of multiple slurry reactors in series.

(1) The use of a microcatalyst, which is either a compound of molybdenum or iron, preferably molybdenum eliminates several downsides to the use of a donor solvent such as required by prior DCL systems. First, energy is lost during preparation of the donor solvent. Energy is required to preheat the donor solvent in the solvent hydrotreater and hydrogen (treat gas) must be compressed and circulated around the hydrotreater. Secondly, the heat released during partial hydrogenation of the donor solvent is lost during cooling to about 100° F. prior to separation of hydrogen for recycle. In comparison, all of the heat release occurs in the liquefaction reactors during non-donor operation which minimizes the preheat requirement prior to liquefaction. These factors contribute to the higher thermal efficiency of the Microcatalytic coal liquefaction process. Moreover, the use of a microcatalyst and the consequent elimination of the need for a donor solvent also eliminates the need for an expensive solvent hydrotreater to generate the donor solvent, thereby substantially reducing the capital cost of the system. It also permits the use of coals having substantially higher ash contents, from 6 to 20 wt % on a moisture free basis, and the recycle of a substantially higher portion of bottoms than were possible with donor solvent systems. Examples of microcatalysts and their method of preparation are described in U.S. Pat. No. 4,226,742, the contents of which are hereby incorporated by reference in their entirety.

(2) Bottoms recycle or recycle of the hot, unconverted coal from the vacuum tower in the effluent separation section of the plant provides preheat for the coal and solvent in the slurry mix tank. This raises the temperature in the mix tank from approximately 100° F. in the Donor Solvent system to 200° F. to 500° F., more preferably 300° F. to 400° F., and most preferably about 300° F. in the microcatalytic system. This further reduces the energy requirement for preheating the slurry prior to liquefaction. A significant portion of the of the microcatalyst is entrained in the bottoms so that recycling a large portion of the bottoms increases the catalyst concentration in the DCL reactors thereby decreasing the requirement for the addition of fresh catalyst precursor and increasing the conversion efficiency of the DCL process.

(3) Use of an aromatic, 600° F. to 700° F.+, more preferably 630° F. to 670° F.+, and most preferably a 650° F.+ process derived recycle solvent in the DCL process reduces cracking, relative to a donor solvent, and produces a 650° F.− product with a greater fraction of diesel and less light gases and naphtha. The 650° F.− minus product can be selectively upgraded to finished products, e.g. in fixed bed upgrading reactors. In a preferred embodiment, the ratio of DCL reactor feed coal to the recycle solvent to the recycled bottoms is 1 to 1 to 0.5.

(4) The use of two to four, more preferably three slurry reactors in series approaches a plug flow reactor and hence has about one half of the required volume of an ebullated bed reactor. This is possible because of the low gas hold-up in the slurry reactors. Since all of the heat is released in the three liquefaction reactors, the temperature profile can be maintained to maximize selectivity to liquids. Operation of the initial reactor at a somewhat lower temperature has been reported in previous patents as a route to increase conversion and liquid yields.

Upgrading the Liquid Product from DCL

Referring again to FIG. 1 of the drawings, an exemplary process for upgrading the liquid product of the DCL 103 is disclosed in U.S. Pat. No. 5,198,099, the disclosure of which is hereby incorporated by reference in its entirety. Other processes and systems suitable for upgrading the liquid products of the DCL 103 and the indirect liquefaction 105 are commercially available from vendors such as UOP, Axems, Criterion and others.

The diesel product from DCL after upgrading will have a CN of approximately 42 and 47 depending upon cut points of the product and aromatics content. Specific gravity of the product will also vary between 0.83 and 0.90. Hence, making Euro 4 diesel, directly from DCL alone, is not possible.

For the higher required CN and lower specific gravity of the Euro 4 diesel, a Fischer-Tropsch facility producing a 70-75 Cetane Number and lower specific gravity diesel blend stock is added to the plant. The quantity of bottoms from liquefaction will be controlled to provide sufficient feed for generation of H2 for direct liquefaction, raw direct liquefaction product upgrading, and also for gasification to produce syngas for the Fischer-Tropsch unit.

The high octane of the upgraded DCL product will permit blending of the low octane naphtha into the gasoline pool.

H2 and Syngas Generation (PDX)

The PDX reactor in FIGS. 1 and 2 may be any one of a variety of commercially available PDX systems. During partial oxidation, in processes provided commercially by Shell, G. E., Siemens and others, nitrogen compounds in the coal are converted principally to N2. Oxygen in the coal is converted to CO, CO2, and a small amount of COS. Sulfur is converted to H2S. The product gas is cooled and cleaned to remove particulates and other gases, leaving only CO, CO2, and H2. If this stream is to be used in DCL or upgrading, it is then reheated and sent to a water-gas shift section where CO and H2O are converted to H2 and CO2 in the presence of a catalyst. The gas from the water gas shift reactor, which contains H2S, CO2, and H2 for use in DCL or a mixture of H2S, CO2, CO, and H2 for F-T, is then sent to a separation system such as Rectisol or Selexol. These processes are offered commercially by UOP, and others. During this step, separate H2 or H2/CO, H2S, and CO2 streams are produced. Advantages of Selexol are that it produces the CO2 at higher pressure than scrubbing processes such as MEA and requires less energy than Rectisol. The higher pressure reduces the quantity of compression required to sequester the CO2 or to transport the CO2 to the algae production system 118. The H2S and COS, once hydrolyzed, are removed by dissolution in, or reaction with, an organic solvent and converted to valuable by-products such as elemental sulfur or sulfuric acid.

The raw synthesis gas must be reheated before entering a conventional water gas shift reactor system that produces additional hydrogen through the catalytically assisted equilibrium reaction of CO and H2O to form CO2 and H2. Hydrogen is then separated from the CO2, CO, and other contaminants and undergoes a final polishing step prior to being sent to liquefaction or upgrading. Minerals in the coal (ash) separate and leave the bottom of the gasifier as an inert slag. The fraction of the ash entrained with the syngas is removed downstream in filters or water scrubbers. This material is typically recycled to the gasifier.

Fischer-Tropsch

Reactors, catalysts and conditions for performing F-T synthesis are well known to those of skill in the art and are described in numerous patents and other publications, for example, in U.S. Pat. Nos. 7,198,845, 6,942,839, 6,315,891, 5,981,608 and RE39,073, the contents of which are hereby incorporated by reference in their entirety. F-T synthesis can be performed in fixed bed, moving bed, fluid bed, ebullating bed or slurry reactors using various catalysts and under various operating conditions that are selected based on the desired product suite and other factors. Typical F-T synthesis products include paraffins and olefins, generally represented by the formula $nCH_2$. The productivity and selectivity for a given product stream is determined by reaction conditions including, but not limited to, reactor type, temperature, pressure, space rate, catalyst type and syngas composition.

The stoichiometric syngas $H_2/CO$ ratio for F-T synthesis is about 2.0. The ratio of $H_2/CO$ in syngas produced from coal is less than 2, and typically about 0.5. This ratio can be increased by mixing the coal produced syngas with syngas produced from biomass or natural gas, or by producing the syngas from a mixed coal and biomass feed. If such mixing step does not increase the $H_2/CO$ ratio adequately, and additional hydrogen is not conveniently available from other sources, such ratio may be further increased by the water-gas shift reaction. In the case of FT synthesis conversion performed using a cobalt-based catalyst, which does not promote water-gas shift reaction, the $H_2/CO$ ratio of coal produced syngas is preferably increased to about 2.0 before being introduced in the F-T synthesis reactor 113, e.g., by hydrogen produced by the PDX unit 109. If the F-T synthesis conversion is being performed using an iron-based catalyst, which does provoke the water-gas shift reaction, it is not necessary to use a separate shift converter. In any case, however, the water-gas shift reaction generates additional $CO_2$.

Hydroisomerization

Hydroisomerization of the normal paraffins produced in Fischer-Tropsch can be accomplished using a shape selective intermediate pore size molecular sieve. Hydroisomerization catalysts useful for this purpose comprise a shape selective intermediate pore size molecular sieve and optionally a catalytically active metal hydrogenation component on a refractory oxide support. The phrase "intermediate pore size," as used herein means an effective pore aperture in the range of from about 4.0 to about 7.1 Angstrom when the porous inorganic oxide is in the calcined form. The shape selective intermediate pore size molecular sieves used in the practice of the present invention are generally 1-D 10-, 11- or 12-ring molecular sieves. Preferred molecular sieves are of the 1-D 10-ring variety, where 10-(or 11- or 12-) ring molecular sieves have 10 (or 11 or 12) tetrahedrally-coordinated atoms (T-atoms) joined by oxygens. In the 1-D molecular sieve, the 10-ring (or larger) pores are parallel with each other, and do not interconnect. The classification of intrazeolite channels as 1-D, 2-D and 3-D is set forth by R. M. Barrer in Zeolites, Science and Technology, edited by F. R. Rodrigues, L. D. Rollman and C. Naccache, NATO ASI Series, 1984.

Preferred shape selective intermediate pore size molecular sieves used for hydroisomerization are based upon aluminum phosphates, such as SAPO-11, SAPO-31, and SAPO-41. SAPO-11 and SAPO-31 are more preferred, with SAPO-11 being most preferred. SM-3 is a particularly preferred shape selective intermediate pore size SAPO, which has a crystalline structure falling within that of the SAPO-11 molecular sieves. The preparation of SM-3 and its unique characteristics are described in U.S. Pat. Nos. 4,943,424 and 5,158,665. Also preferred shape selective intermediate pore size molecular sieves used for hydroisomerization are zeolites, such as ZSM-22, ZSM-23, ZSM-35, ZSM-48, ZSM-57, SSZ-32, offretite, and ferrierite. SSZ-32 and ZSM-23 are more preferred.

A preferred intermediate pore size molecular sieve is characterized by selected crystallographic free diameters of the channels, selected crystallite size (corresponding to selected channel length), and selected acidity. Desirable crystallographic free diameters of the channels of the molecular sieves are in the range of from about 4.0 to about 7.1 Angstrom, having a maximum crystallographic free diameter of not more than 7.1 and a minimum crystallographic free diameter of not less than 3.9 Angstrom. Preferably the maximum crystallographic free diameter is not more than 7.1 and the minimum crystallographic free diameter is not less than 4.0 Angstrom. Most preferably the maximum crystallographic free diameter is not more than 6.5 and the minimum crystallographic free diameter is not less than 4.0 Angstrom.

A particularly preferred intermediate pore size molecular sieve, which is useful in the present process is described, for example, in U.S. Pat. Nos. 5,135,638 and 5,282,958, the contents of which are hereby incorporated by reference in their entirety. In U.S. Pat. No. 5,282,958, such an intermediate pore size molecular sieve has a crystallite size of no more than about 0.5 microns and pores with a minimum diameter of at least about 4.8 .ANG. and with a maximum diameter of about 7.1 .ANG. The catalyst has sufficient acidity so that 0.5 grams thereof when positioned in a tube reactor converts at least 50% of hexadecane at 370.degrees C., a pressure of 1200 psig, a hydrogen flow of 160 ml/min, and a feed rate of 1 ml/hr. The catalyst also exhibits isomerization selectivity of 40 percent or greater (isomerization selectivity is determined as follows: 100.times.(weight % branched C.sub.16 in product)/(weight % branched C.sub.16 in product+weight % C.sub.13− in product) when used under conditions leading to 96% conversion of normal hexadecane (n-C.sub.16) to other species. Such a particularly preferred molecular sieve may further be characterized by pores or channels having a crystallographic free diameter in the range of from about 4.0 to about 7.1 .ANG., and preferably in the range of 4.0 to 6.5 .ANG. The crystallographic free diameters of the channels of molecular sieves are published in the "Atlas of Zeolite Framework Types", Fifth Revised Edition, 2001, by Ch. Baerlocher, W. M. Meier, and D. H. Olson, Elsevier, pp 10 15.

If the crystallographic free diameters of the channels of a molecular sieve are unknown, the effective pore size of the molecular sieve can be measured using standard adsorption techniques and hydrocarbonaceous compounds of known minimum kinetic diameters. See Breck, Zeolite Molecular Sieves, 1974 (especially Chapter 8); Anderson et al. J. Catalysis 58, 114 (1979); and U.S. Pat. No. 4,440,871, the pertinent portions of which are incorporated herein by reference. In performing adsorption measurements to determine pore size, standard techniques are used. It is convenient to consider a particular molecule as excluded if does not reach at least 95% of its equilibrium adsorption value on the molecular sieve in less than about 10 minutes (p/po=0.5; 25° C.). Intermediate pore size molecular sieves will typically admit molecules having kinetic diameters of 5.3 to 6.5 Angstrom with little hindrance. Hydroisomerization catalysts useful in the present invention optionally comprise a catalytically active hydrogenation metal. The presence of a catalytically active hydrogenation metal leads to product improvement, especially VI and stability. Typical catalytically active hydrogenation metals include chromium, molybdenum, nickel, vanadium, cobalt, tungsten, zinc, platinum, and palladium. The metals platinum and palladium are especially preferred, with platinum most especially preferred. If platinum and/or palladium is used, the total amount of active hydrogenation metal is typically in the range of 0.1 to 5 weight percent of the total catalyst, usually from 0.1 to 2 weight percent, and not to exceed 10 weight percent. The refractory oxide support may be selected from those oxide supports, which are conventionally used for catalysts, including silica, alumina, silica-alumina, magnesia, titania and combinations thereof.

The conditions for hydroisomerization will be tailored to achieve an isomerized liquid intermediate with specific branching properties, as described above, and thus will depend on the characteristics of feed used. In general, conditions for hydroisomerization in the present invention are mild such that the conversion of hydrocarbon materials boiling below about 700° F. is maintained above about 50 to about 80 wt % in producing the intermediate isomerates.

Mild hydroisomerization conditions are achieved through operating at a lower temperature, generally between about 390 and 650.degree. F. at a LHSV generally between about 0.5 hr.sup.-1 and about 20 hr.sup.-1. The pressure is typically from about 15 psig to about 2500 psig, preferably from about 50 psig to about 2000 psig, more preferably from about 100 psig to about 1500 psig. Low pressure provides enhanced isomerization selectivity, which results in more isomerization and less cracking of the feed, thus producing an increased yield. Hydrogen is present in the reaction zone during the hydroisomerization process, typically in a hydrogen to feed ratio from about 0.5 to 30 MSCF/bbl (thousand standard cubic feet per barrel), preferably from about 1 to about 10 MSCF/bbl. Hydrogen may be separated from the product and recycled to the reaction zone.

These mild hydroisomerization conditions using the shape selective intermediate pore size molecular sieves produce intermediate isomerates comprising paraffinic hydrocarbon components having specific branching properties, i.e., having controlled amounts of branching overall.

$CO_2$ Recycle

As described above, $CO_2$ produced by the process of the invention is preferably captured and used to produce algae or cyanobacteria (blue-green algae) in a PBR. The PBR system can involve closed or open reactor systems. Closed systems enable maximum production of specifically selected strain(s) of algae and minimize water loss and the contamination of the cyanobacteria or algae strain from external sources, and allow the capture of oxygen produced in the algae generation step for use in other combustion or PDX related steps in the overall process. There are a number of commercially available algae production systems. Examples of preferred closed PBR systems is that described in published US patent application numbers 2007/0048848 and 2007/0048859, which are incorporated herein by reference in their entirety, and that developed and in commercial use by Solix Biofuels, Inc. An example of a preferred open system is that developed and in commercial use by Sapphire Energy, Inc. The algae produced in the PBR can be isolated in aqueous streams for use as a soil treatment material in order to increase the carbon content of the soil and for inducing photosynthesis to generate additional algae in the soil. The algae can also be dried and combined with other additives such as organic binders, alkali containing residues from the gasification and/or DCL facility and the final mixture used as a natural bio-fertilizer. In this capacity, the material not only results in further growth of algae in the soil via photosynthesis and thereby increasing its natural carbon content, but also causes various forms of algae (e.g. cyanobacteria) to fix nitrogen, all of which promotes the growth of plant life in the treated soil and greatly reduces the GHG, and particularly the $CO_2$, footprint of the invention. One PBR system suitable for the purposes of this invention is that described in provisional U.S. patent application Ser. No. 61/422,613, the contents of which are incorporated herein by reference in their entirety. Other PBR's can also be used, such as those developed by BioProcess Algae, LLC, Sapphire Energy, Inc. or others. In accordance with a preferred embodiment of the invention, the naturally occurring complement of microorganisms, including cyanobacteria, occurring in the soil or type of soil to which the bio-fertilizer or soil amendment is to be applied is optimized and amplified in a PBR and the resulting material is dewatered and dried and treated with desirable additives; after which it is granulated, optionally coated with materials to optimize its spreading characteristics and distributed on the soil that is to be fertilized or restored. Alternatively, microorganisms that include one or more strains of cyanobacteria compatible with the type of soil and environmental conditions where the bio-fertilizer is to be applied, are amplified in a PBR to generate the material for the bio-fertilizer.

In addition to the beneficial reduction of the GHG footprint of the ICBTL system of the invention by terrestrially sequestering the $CO_2$ consumed by cyanobacteria in the produced fertilizer, the integrated system of the invention has the additional extremely important advantageous characteristic that the cyanobacteria applied to the soil, especially because it can be specifically selected to be compatible with the makeup of the soil to which it is applied, multiplies through photosynthesis, thereby extracting more $CO_2$ from the atmosphere and fixing atmospheric nitrogen. This property results in an increase in the net $CO_2$ sequestered by a factor of 30, and potentially as much 150, fold over the $CO_2$ consumed during the production of algae in the ICBTL process of the invention, and greatly enriches the fertility of soil. The factor of 30 or greater allows capture of more $CO_2$ than is produced in the overall plant.

The quality of the natural bio-fertilizer, as affected by the quality of the water and the purity of the $CO_2$ and other nutrient streams provided to the PBR from other steps in the ICBTL process of the invention, can be controlled to generate food grade/FDA certified material for use in enhancing growth of various food crops; to an intermediate grade to serve as a soil amendment material for reclamation of arid soils to prevent or inhibit wind erosion via formation of a bio-active crust; or to lower purity material for use in reclamation of spent mine soils where the addition of a bio-reactive material inhibits leaching and erosion of contaminated soils to improve the quality of water drain off.

The natural bio-fertilizer can also be used as a direct replacement for conventional ammonia based fertilizer, where it offsets large amounts of $CO_2$ that would otherwise be generated in production of $NH_3$ and the full range of ammonia based fertilizers. This also leads to other downstream benefits, such as a reduction in run off of $NH_3$ based components that contaminate downstream waterways and cause unwanted blooms of algae and other aquatic plants.

In order to achieve maximum $CO_2$ capture in the system of the invention and convert substantially all of the $CO_2$ to algae, the $CO_2$ can be stored during periods of low light or darkness when there is not enough light for photosynthesis to produce algae from the $CO_2$. Alternatively, algae production can be continued using artificial light sources. To further minimize the CO2 footprint on a lifecycle basis, the algae is then used to produce a bio-fertilizer. Coupling these steps together allows for recovery and reuse of the equivalent of as much as 270 times the $CO_2$ conversion to algae alone using an open pond or PBR without the use of artificial light. Without storage, the quantity of $CO_2$ reused is reduced by a factor of three or four. Techniques for storage of $CO_2$ include liquefaction of the $CO_2$, conversion of the $CO_2$ to ammonium bisulfide or urea by well-known conventional chemical processes, physical storage and others.

There are several commercial systems available for separating hydrogen from carbon monoxide. Pressure swing adsorption (PSA) processes rely on the fact that under pressure, gases tend to be attracted to solid surfaces, or "adsorbed". The higher the pressure, the more gas is adsorbed; when the pressure is reduced, the gas is released, or desorbed. PSA processes can be used to separate gases in a mixture because different gases tend to be attracted to different solid surfaces more or less strongly. Syngas mixtures of H2, CO and CO2 can be separated by PSA to produce streams rich in hydrogen. Alternatively, syngas can be first subjected to water gas shift to produce a binary mixture of H2 and CO2 which can be separated by PSA or by other means known in the art such as membrane separation (where H2 permeates much more effectively than $CO_2$ to generate substantially pure hydrogen streams). Finally active metal membranes of palladium and other related metal alloys may be used to separate hydrogen from other gases and commercially available options have been produced. U.S. Pat. Nos. 5,792,239, 6,332,913 and 6,379,645, and published applications Nos. US2003/3190486 and US2009/0000408 describe various ones of such separation techniques and are hereby incorporated by reference in their entireties.

The CO$_2$ recovery can be conducted using various conventional recovery processes including, but not limited to, adsorption, absorption (e.g. pressure swing adsorption (PSA) and displacement purge cycles (DPC)), cryogenic separation, membrane separation, combinations thereof and the like. While one or more recovery processes may be needed to recover CO$_2$ from syngas or tail gas, by-product gas from a reformer or C3+ product upgrader will not contain appreciable amounts of H$_2$ or H$_2$O and thus may not need any recovery process except for condensation of heavy hydrocarbons (C6+). Additionally, while it is desirable to use recovered CO$_2$ in processes of the present invention, it is also possible to supplement or replace recovered CO$_2$ with CO$_2$ obtained from alternative sources within an integrated complex.

Product streams from the process of the present invention can include, for example, a synthetic crude and other individual product streams such as liquefied petroleum gas (C3-C4), condensate (C5-C6), high-octane blend components (C6-C10 aromatic-containing streams), jet fuel, diesel fuel, other distillate fuels, lube blend stocks or lube blend feed stocks that can be produced and sold as separate products.

The fully integrated process flow scheme of the embodiment of the invention illustrated in FIG. 1 provides a combination of features and advantages that cannot be achieved with known alternatives.

The effluent water from DCL will contain H$_2$S, ammonia, and oxygenates such as phenols, cresols. H$_2$S and ammonia are initially recovered in a sour water stripper with the H$_2$S going to a Claus plant and the ammonia going to the algae plant or sales. The stripped water, which is rich in oxygenates, is either sent to a PHENOSOLVAN for recovery of a concentrated oxygenate stream or sent to the gasifier or PDX unit. Overall, feed to the plant in this case is coal. Where available, natural gas should be used to supplement the coal. This allows use of natural gas for hydrogen generation and allows higher conversion of the coal to liquid fuels. Products from the plant will include LPG, gasoline, and diesel fuel. Where desirable, LPG, gasoline, jet fuel, and diesel can be produced. In a further case, the gasoline fraction can be used as a source of aromatics and the raffinate used for production of olefins in a chemical plant.

Example 1

The following table summarizes the properties of the Chinese bituminous coal that was used as the feed coal for a demonstration of the DCL process.

|  | Wt %, DAF |
| --- | --- |
| Elemental Analysis |  |
| Carbon | 81.58 |
| Hydrogen | 4.92 |
| Nitrogen | 1.04 |
| Sulfur | 0.64 |
| Oxygen (by diff) | 11.81 |
| Total | 100 |
| Petrographic Analysis |  |
| Vitrinite, wt % | 66.2 |
| semi-vitrinite, wt % | — |
| Micronite, wt % | 0.4 |
| Inertinite, wt % | 29.9 |

Ash, wt % dry coal 5.34

Because of the high inertinite content, those skilled in the art would consider this coal to be a poor candidate for direct coal liquefaction.

Testing of DCL with the above coal feed was performed in an integrated 0.1 ton/day pilot plant. During operation with microcatalyst and a solvent/coal/bottoms rate of 1/1/0.5, a coal conversion to 1,000° F. minus of 62% (wt % on a MAF basis) was achieved. This results in an ash level in the unconverted 1000° F.+ bottoms of 13 wt %; hence, this material is an excellent feed to either slurry or molten feed PDX for the production of hydrogen and syngas. More importantly, the bottoms from an even higher ash coal would still be an acceptable feed for a PDX unit.

In the Example, coal conversion in DCL is set to provide sufficient hydrogen and syngas for the Euro 4, max diesel case.

Example 2

For a balanced plant producing 71 KB/SD of C3+ liquids from DCL and 10.8 KB/SD of C3+ liquids from F-T, the diesel product produced using the coal of Example 1 will be 36.8 KB/SD and meet all the Euro 4 product specifications or 45 LV % of the plant liquids output (1.44 barrels of Euro 4 diesel per ton of dry coal fed to the plant).

The overall thermal efficiency for the balanced plant with only coal as the feed, including 100 percent capture of the CO2 produced in the plant on a life cycle basis, and producing finished LPG, gasoline, and diesel results in a Thermal Efficiency (HHV) of 65.1%. This compares with a Thermal Efficiency of 59.75% reported for a Direct Liquefaction plant (without F-T) ex any capture or sequestration of CO2 produced in the plant.

The diesel produced in the combined DCL/F-T plant has a 51 Cetane number and a specific gravity of 0.845 or less in addition to meeting all other Euro 4 specifications. The 0.845 specific gravity product is the upper limit for the spec and will have the highest possible volumetric energy content. In addition, the fuel will contain less than 5 LV % aromatics and preferably less than 2 LV % aromatics to improve lubricity. If a higher specific gravity were allowed under a revised specification, less F-T would be required and thermal efficiency would improve and mileage per gallon of fuel would improve.

The bottoms stream produced with this coal or a higher ash coal is an acceptable feed for gasification utilizing high temperature, efficient slurry or entrained bed gasifiers. Utilization of these gasifiers insures that the slag produced from the gasifiers will be non-leachable and not present an environmental hazard. In addition, since the bottoms are dried during gasification they will also increase the efficiency of the gasifier.

Overall, the invention offers a route that can produce an outstanding yield of Euro 4 diesel from a wide range of coals, including those with high inertinite and ash content, while producing only finished fuels, a bio-fertilizer, and non-leachable ash that can be used as aggregate in cement while capable of reducing CO2 emissions by up to 100% or more.

REFERENCES (1) Yong-Wang Li, "Indirect Coal Liquefaction—Better Solution to Clean Energy System", Synfuels China, State Key Laboratory of Coal Conversion, Institute of Coal Chemistry, Chinese Academy of Sciences, Taiyuan (2) Headwaters, "Headwaters DCL Technology—Conversion of Coal into Clean Transportation Fuels", Aug. 5, 2008

(3) Lepinski, J. A., "Overview of Coal Liquefaction", U.S.—India Working Group Meeting, Washington, D.C., Nov. 18, 2005
(4) Rentech, "The Economic Viability of an FT Facility Using PRB Coals", Presentation to the Wyoming Governor's Office and the Wyoming Business Council, Apr. 14, 2005
(5) National Energy Technology Laboratory, "Affordable, Low-Carbon Diesel Fuel from Domestic Coal and Biomass", DOE/NETL-2009/1349, Jan. 14, 2009
(6) Yuzhuo Zhang, "Shenhua Coal Conversion Technology and Industry Development, Shenhua Group Corporation Ltd., China
(7) Winslow and Schmetz, Leonardo Technologies, Inc., "Direct Coal Liquefaction Overview Presented to NETL, Mar. 23, 2009
(8) NETL, Process Engineering Division, PED-IGCC-98-002, "Shell Gasifier IGCC Base Cases", June 2000
(9) Stiegel, G. J., et. al., "An Environmental Assessment of IGCC Power Systems", Nineteenth Annual Pittsburgh Coal Conference, Sep. 23-27, 2002
(10) O'Rear, D. J., et. al., Chevron Research Company, "Catalytic Upgrading of H-Coal Syncrudes", 1981 American Chemical Society
(11) Gray, D. et. al, The Mitre Corporation, "The Hybrid Plant Concept: Combining Direct and Indirect Coal Liquefaction Processes", May 31, 1991.

What is claimed is:

1. A method for producing diesel fuel from feed coal, comprising the steps of:
   a) supplying at least 70% of the feed coal to a direct coal liquefaction (DCL) reactor and operating such reactor in a catalytic process for converting between 50 and 62% of the feed coal supplied to such reactor on a moisture and ash free (MAF) basis to coal liquids;
   b) upgrading the coal liquids produced in step a to produce a diesel blend stock;
   c) gasifying the remainder of the feed coal and DCL product having a boiling point greater than about 1000° F. and to produce H2 for supply to the DCL step and syngas;
   d) converting syngas produced in step c by a Fischer Tropsch (F-T) process to predominately paraffinic liquids;
   e) upgrading the liquids produced in step d into products including a diesel blend stock; and
   f) blending the diesel blend stock produced in step b with the diesel blend stock produced in step e in a ratio of between 3 and 14 to 1 to produce diesel fuel having a Cetane number of greater than 47 and a specific gravity of 0.845 or less.

2. The method of claim 1 wherein the catalytic process in the DCL reactor includes adding microcatalyst to the input of the DCL reactor and recycling DCL product having a boiling point greater than between 600 and 650° F.

3. The method of claim 2 wherein said microcatalyst consists essentially of molybdenum.

4. The method of claim 3 wherein the concentration of the microcatalyst added during steady-state operation of the DCL reactor is equivalent to 100 to 300 wppm relative to the feed coal on a moisture and ash free basis.

5. The method of claim 3 wherein the recycled DCL product includes a portion of the 1000° F.+ fraction of the DCL product.

6. The method of claim 2 wherein the DCL reactor includes a plurality of series connected slurry liquefaction reactors.

7. The method of claim 1 wherein said DCL reactor is operated for converting between 54 and 60% of the feed coal supplied to said reactor on a moisture and ash free (MAF) basis to coal liquids.

8. The method of claim 2 wherein the temperature of the recycled DCL product is between 200 and 500° F.

9. The method of claim 5 wherein the temperature of the recycled DCL product is between 300 and 400° F.

10. The method of claim 2 wherein the ratio of diesel blend stock produced by step b that is blended in step f with the diesel blend stock produced by step e is between 5 and 7 to 1 and the blended diesel fuel produced in step (f) has a Cetane number of at least 51.

11. The method of claim 3 wherein said microcatalyst is added in the form of a catalyst precursor solution of phosphomolybdic acid that is added in an amount that is equivalent to adding between 50 wppm and 2% molybdenum relative to the feed coal on an MAF basis.

12. The method of claim 2 wherein said molybdenum microcatalyst is added at a rate between 100 and 1,000 ppm by weight with respect to the coal feed on an MAF basis.

13. The method of claim 2 to wherein said molybdenum microcatalyst is added at a rate between 100 and 500 ppm by weight with respect to the coal feed on an MAF basis during steady-state operation.

14. The method of claim 2 where the ash content of the coal is between 6 and 20 wt % on the moisture free basis.

15. The method of claim 2 wherein the inertinite content of the coal is greater than 10%.

16. The method of claim 1 wherein the Cetane Number of the diesel fuel produced in step f is at least 51.

17. The method of claim 2 wherein the ratio of DCL reactor feed coal to the recycled DCL product having a boiling point between 650 and 1000° F. to the recycled DCL product having a boiling point above 1000° F. is about 1 to 1 to 0.5.

18. The method of claim 1 further including using CO2 produced in step c to produce algae.

19. The method of claim 18 further including using ammonia produced in step b in the production of said algae.

20. The method of claim 18 further including producing biofertilizer with the use of said algae.

* * * * *